Figure 1:
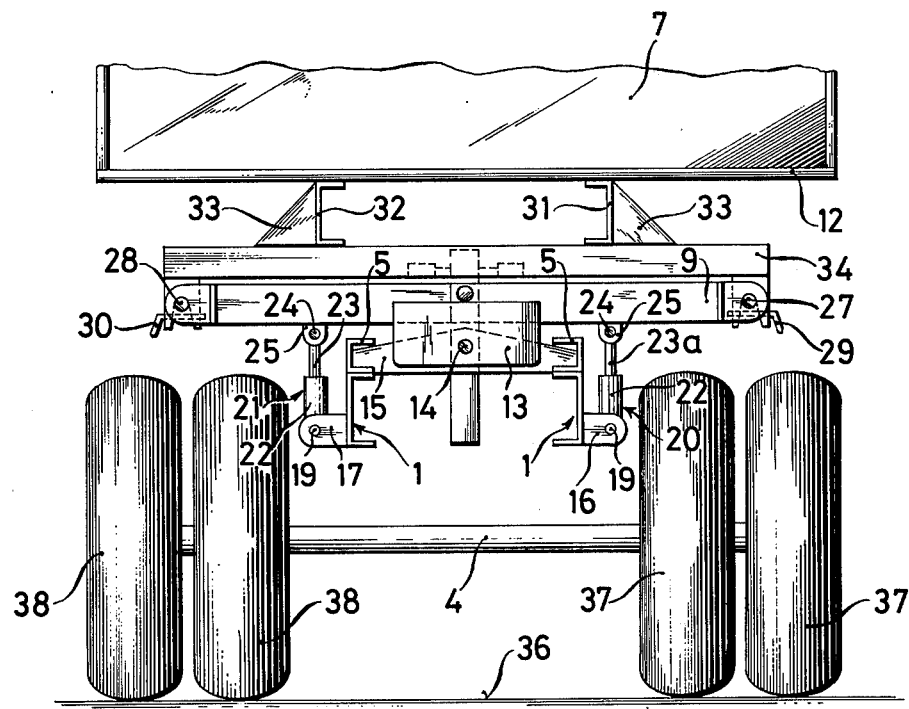

United States Patent [19]

Langendorf

[11] 4,036,528
[45] July 19, 1977

[54] TRUCK WITH TILTABLE BODY

[76] Inventor: Heinrich Langendorf, Bahnhofstrasse 115, 4355 Waltrop, Germany

[21] Appl. No.: 622,065

[22] Filed: Oct. 14, 1975

[51] Int. Cl.² .............................................. B60P 1/16
[52] U.S. Cl. .................................. 298/17 S; 280/6 H
[58] Field of Search ............. 280/6 H; 298/17 S, 17.5, 298/22 R, 18

[56] References Cited

U.S. PATENT DOCUMENTS

| | | | |
|---|---|---|---|
| 2,556,610 | 6/1951 | Biszanitz | 298/17 S |
| 2,999,721 | 9/1961 | Wood | 298/17 S |
| 3,640,578 | 2/1972 | Finney | 298/17 S |

Primary Examiner—Philip Goodman
Attorney, Agent, or Firm—Malcolm W. Fraser

[57] ABSTRACT

A truck has a rear wheel-carrying chassis frame, on which is mounted a sub frame provided at its rear with a tipping member to which the rear end of the truck body is pivoted for vertical tilting movements. The tipping member can pivot about an axis longitudinally of the chassis frame and the mechanism for that purpose is located between the chassis frame and the tipping member.

7 Claims, 9 Drawing Figures

TRUCK WITH TILTABLE BODY

This invention relates to tipping vehicles comprising a chassis and a tipping body which initially rests on a front frame member and can be inclined backwards by pivoting about a rear axis contained in a rear tipping member, by means of an elevating mechanism, which may be hydraulically operated, mounted on the chassis.

A standard lorry usually has a tipper frame which is fixed to the chassis of the lorry. The invention can be applied not only to self-propelled lorries but also to tipping trailers which may be constructed with or without subframes. Vehicles in accordance with the invention can be constructed as single-side, double-side and triple-side tippers. With multiple-side tippers, apart from the rear pivoting shafts running transverse to the vehicle longitudinal axis, lateral pivoting shafts are provided on one or both sides of the vehicle, usually at the ends of the front and rear chassis members. The lifting device may consist of at least one hydraulic tipper ram, which can be mounted either on the chassis or on a quadrant-shaped lever situated between the chassis and the tipping body.

With this type of lorry, tipping is frequently carried out on laterally sloping ground or on soft ground. In such cases, the tipping body leans towards the side of the vehicle to which the rear axle slopes. The resulting displacement of the centre of gravity of the tipping body and its load tends to cause the vehicle to tip over sideways. This tendency is considerably increased under certain conditions, particularly with the relatively long tipping bodies and/or when adhesive loads are being transported and/or when the resistance to compression of the ground supporting the rear wheels of the vehicle varies. In practice, this frequently leads to tipping accidents, in which people are injured and/or the vehicle and tipper frame are distorted. An object of the invention is to avoid much damage.

It is well known to counteract lateral displacement of the tipper under the conditions of operation described by means of special devices.

Thus, a well-known lorry is provided with a tipper ram arrangement, which is positioned on the vehicle and can only be pivoted about a horizontal axis. The ram is located on the front side of the tipper in a duct which excludes pivoting of the tipper ram arrangement opposite the front side of the tipping body. For further security the vehicle has a rear wall which opens automatically during tipping.

Another and likewise well-known lorry uses tipper rams which are accommodated at the side of a support frame in ducts and which can only be pivoted around horizontal axes. There is also a well-known lorry which has a quadrant-shaped lever unit between the floor of the tipping body and the chassis and is intended to exclude lateral displacement of the tipping body. The middle scissor joint is spanned by a tipping ram in this construction.

All vehicles of this type however have disadvantages, which arise from the fact that the chassis of the lorry is used as counterweight to the tipping body, while both parts are connected to one another more or less rigidly in the transverse direction. On the one hand, even then tipping over of the vehicle during tipping of the load cannot be prevented in all cases and on the other hand considerable stabilising forces are produced in the chassis, which has to be expensively strengthened, if such forces are not to cause damage.

The aim of the invention is to keep the tipping body horizontal at least in the area of the rear axles of the vehicle independent of the inclined position brought about by the local tipping conditions.

According to the invention, there is provided a tipping vehicle comprising a chassis and a tipping body which initially rests on a front frame member and can be inclined backwards by pivoting about a rear axle contained in a rear tipping member by means of an elevating mechanism mounted on the chassis, the rear tipping member being mounted on the chassis for pivotal movement about an axis extending in the longitudinal direction of the vehicle and drive means for pivoting the rear tipping member being coupled between the rear tipping member and the frame, whereby after the tipping body has been lifted from the front frame member the rear tipping member and the elevating mechanism pivot unitl the transverse direction of the tipping body is horizontal.

Control can of course be carried out by the person operating and supervising the tipping process. Installation of a regulator which automatically performs the required control operation and of which the rest position is the horizontal, is more advantageous. The tipping body must be lifted clear of the front frame member before switching on said drive means unless the front frame member can also be pivoted, but this would in general use too much power. Power requirements can be reduced by using universal joints for the connections to the elevating mechanism so that no individual pivoting drive is needed therefor.

Preferably the rear tipping member is positioned so that it can be pivoted about the longitudinal axis of the vehicle. According to a further feature of the invention, the drive is preferably controlled hydraulically using a thrust piston unit, which is pivotally connected to the rear tipping arm and to the chassis. It can then be advantageous to build a gear into the drive. For this reason, the rear tipping member may include a lever to which the thrust piston unit is pivotally connected.

When several thrust piston units are used, they are mounted on both sides to the pivot axis running in the longitudinal direction of the vehicle.

Especially with long rear tippers, relatively heavy and long tipping rams are required for the elevating mechanism. For this reason, the elevating mechanism may include a support member coupled to the chassis by pivotal drive means which is arranged to operate in synchronism with the drive means for pivoting the rear tipping arm.

The above-mentioned regulator, of which the rest position is the horizontal, can be constructed as a pendulum regulator. However, other regulators such as spirit levels can also be used.

Figure 2:
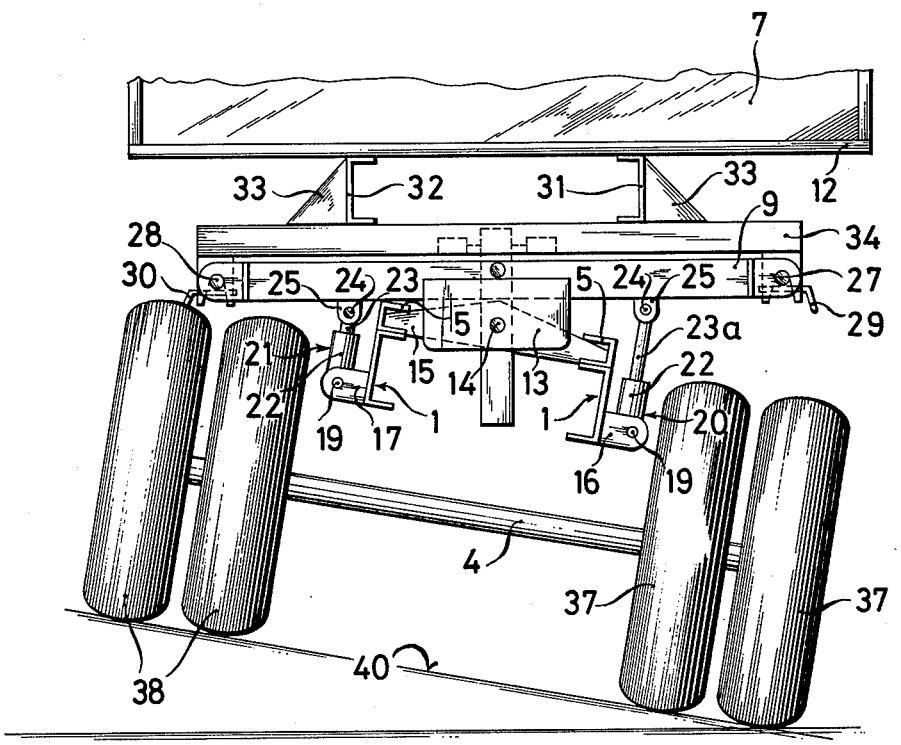
Figure 3:
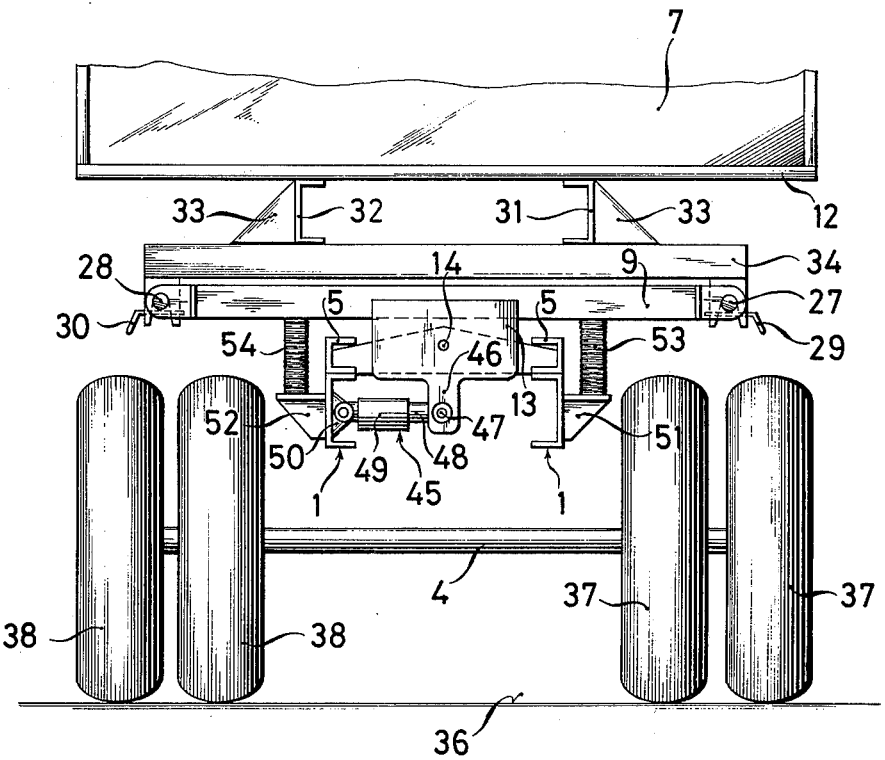
Figure 4:
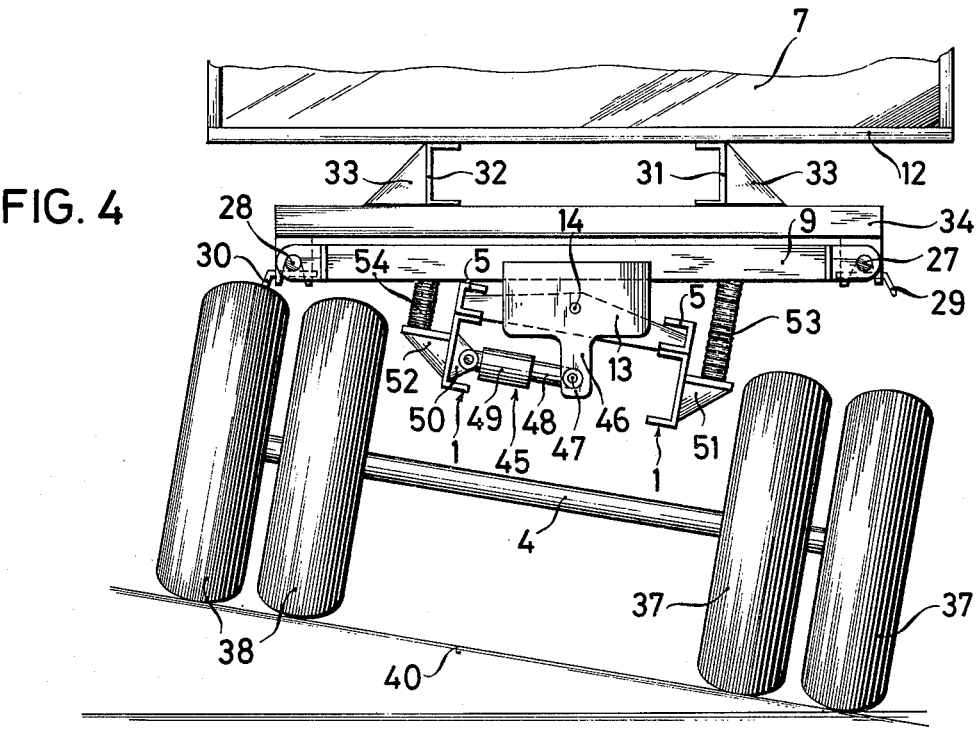
Figure 5:
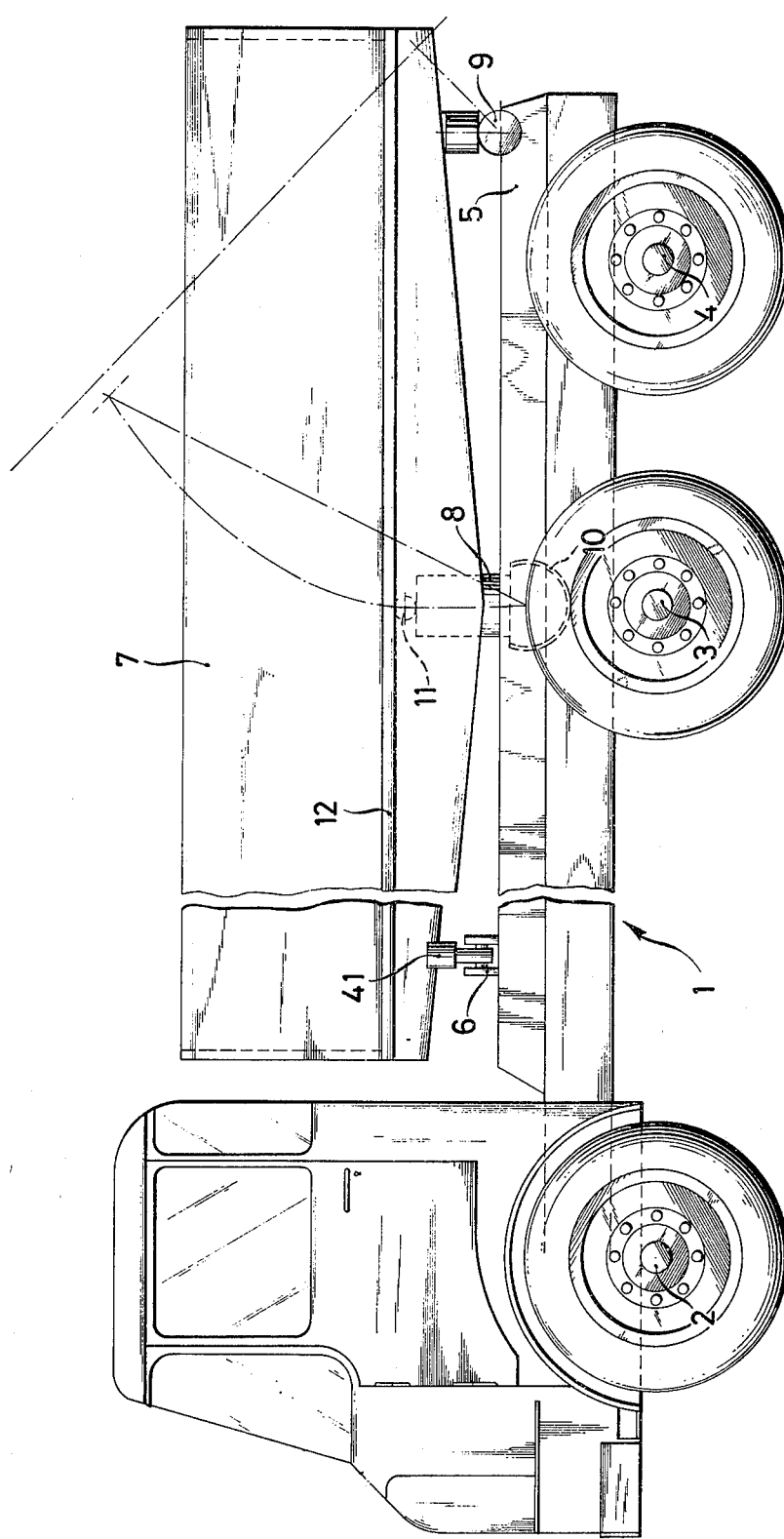
Figure 6:
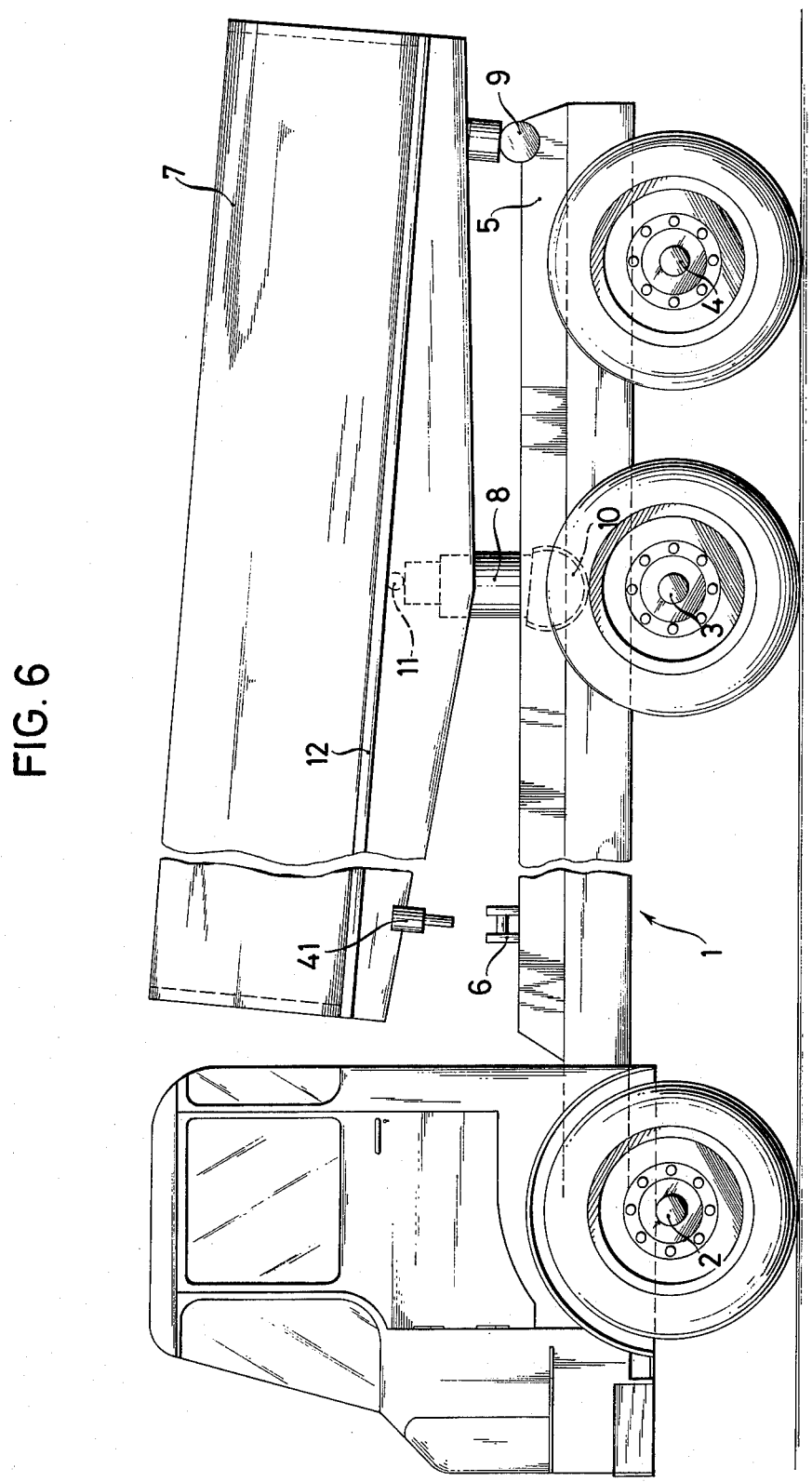
Figure 7:
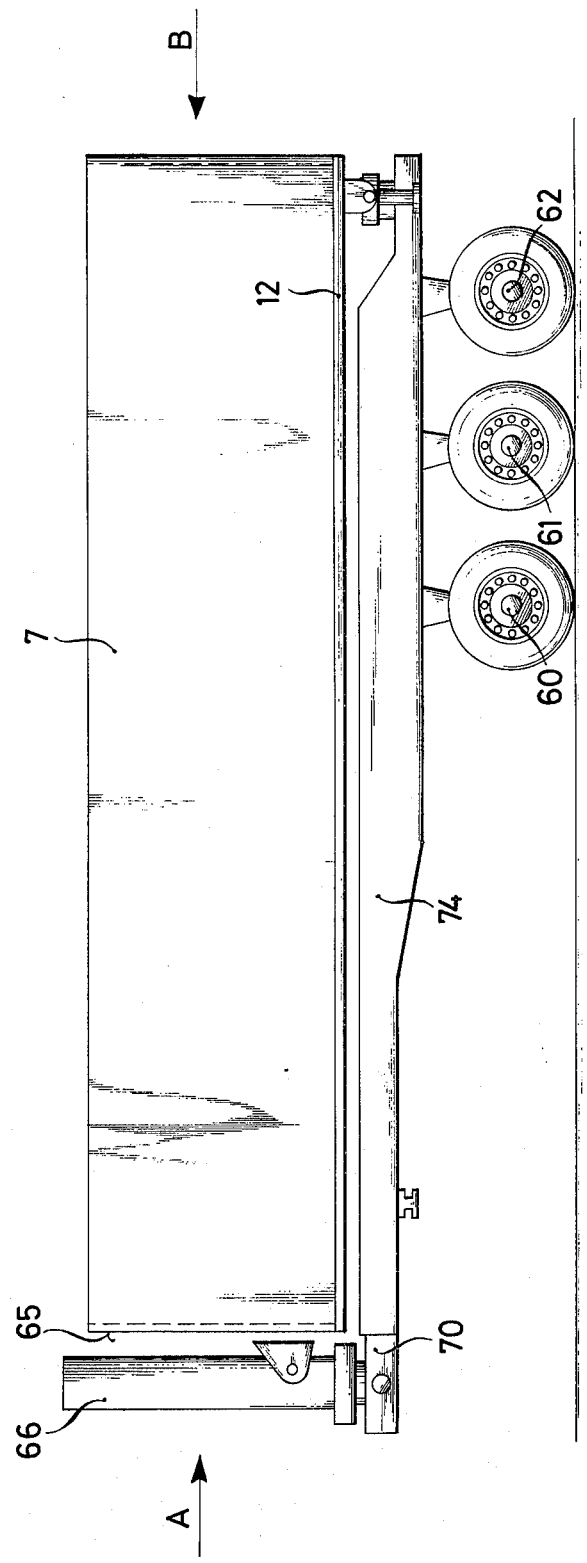
Figure 8:
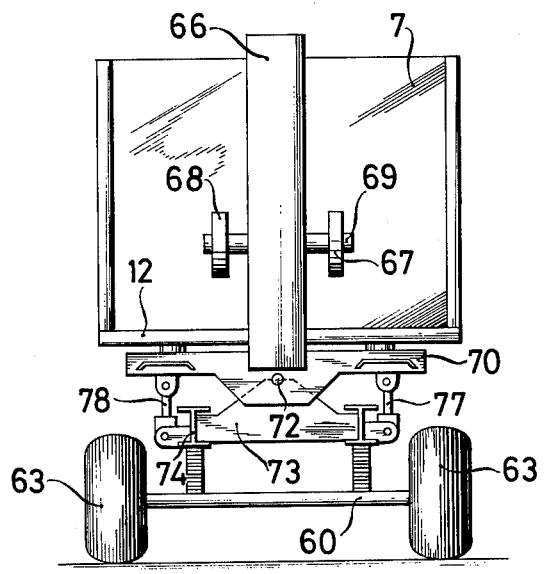
Figure 9:
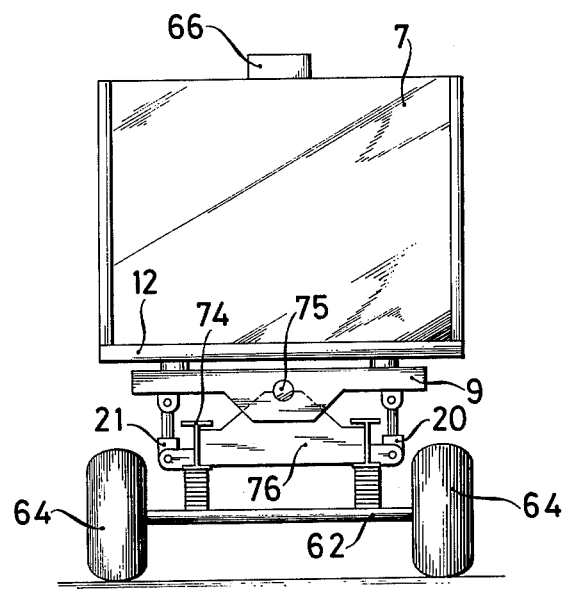

The invention will be more readily understood from the following description of embodiments thereof, with reference to the accompanying drawings, in which:

FIG. 1 is a rear elevational view of a lorry according to the invention,

FIG. 2 is a view corresponding to FIG. 1 of the lorry just before the start of the tipping process, FIG. 3 shows, in a representation corresponding to FIG. 1, a modified embodiment of the invention, FIG. 4 shows, in a representation corresponding to FIG. 2, the embodiment according to FIG. 3, FIG. 5 is a side view of the lorry shown in FIG. 1, FIG. 6 is a side view similar to FIG. 5 after rear tipping has started, FIG. 7 is a side view of a trailer according to the invention, FIG. 8 is an end view of the trailer shown in FIG. 7 in the direction of the arrow A, and FIG. 9 is an end view of the trailer shown in FIG. 7 in the direction of the arrow B.

FIGS. 1 to 6 show a lorry having the usual chassis 1 with a front axle 2 and two rear axles 3 and 4. On the chassis 1 is mounted a subframe 5 which has a front frame member 6 at its front end, on which the tipping body 7 rests and to which it is locked before tipping. The tipping body 7 can be tipped backwards about an axis contained in a rear tipping member 9 by means of an elevating mechanism comprising a tipping ram 8. The tipping ram is supported by a hemispherical bearing 10, which is positioned on the subframe 5. The opposite end of the tipping ram 8 is coupled to the floor 12 of the tipping body by a universal joint 11.

In the embodiment shown in FIGS. 1 and 2, the rear tipping member 9 is provided with a downwardly projecting bracket 13. A shaft 14, which is parallel to the longitudinal central axis of the vehicle, is journaled in the bracket 13. The shaft 14 has an outer support member 15 which is fixed to the subframe 5. Brackets 16 and 17, which extend in the longitudinal direction of the vehicle, are fixed to the chassis 1 on both sides of the central pivot shaft 14. Hydraulic thrust piston units 20 and 21 are pivotally connected to the brackets 16 and 17 respectively by respective pins 19 which run in the longitudinal direction of the subframe 5. The thrust piston units 20 and 21 consist of respective cylinders 22 and piston rods 23 and 23a, which are pivotally connected to brackets 25 by pins 24 parallel to the corresponding pins 19. The brackets 25 are fixed to the rear tipping member 9.

The ends of the rear tipping member 9 are formed as shafts 27 and 28, around which the tipping body 7 can be pivoted in either direction. Bolts 29 and 30 secure the tipping body before tipping.

Two parallel girders 31 and 32 of U-shaped cross-section, are secured to the underside of the floor 12 of the tipping body 7. The girders 31 and 32 are connected by gusset plates 33 to a transverse member 34.

FIG. 1 shows the lorry standing on horizontal ground 36, the vehicle wheels being shown at 37 or 38. The two thrust piston units 20 and 21 are then locked and both piston rods 23a are extended by the same length so that axle 4 is parallel to the rear tipping member 9.

If, on the other hand, the ground is inclined to the horizontal, as shown in FIG. 2, so that the vehicle axle 4 assumes a corresponding inclination, the tipping body 12 initially adopts the same inclination, because it remains parallel to the axle 4. When tipping is to take place, a clamping member 41 is unlocked from the front frame member 6. Next the tipping ram 8 is operated so that the tipping body 7 lifts from the front frame member 6, as shown in FIG. 6.

A control mechanism (not shown in detail), has a regulator of which the rest condition is the horizontal, thereupon unlocks the thrust piston units 20 and 21 (see FIG. 2). The regulator then operates the control device so that the piston rod 23a of the thrust piston unit 20 extends further than the piston rod 23 of the thrust piston unit 21, the latter piston rod being simultaneously retracted. Thereby the rear tipping member 9 is pivoted about the shaft 14, until the rear tipping member 9 and the tipping body 7 are in a horizontal position. The hemispherical bearing 10 and the universal joint 11 allow the tipping ram 8 to pivot so that the longitudinal axis thereof remains perpendicular to the floor 12 of the tipping body 7 in the transverse direction. In this position the tipping body 7 can be tipped backwards without danger.

The embodiment shown in FIGS. 3 and 4 differs from that shown in FIGS. 1, 2, 5 and 6 in that a single thrust piston unit 45 and a single lever are used. For this purpose, a downwardly extending projection 46 is formed on the bracket 13 at right angles to the rear tipping member 9. The projection 46 forms a lever, at the end of which is a pivot pin 47, to which the piston rod 48 of the thrust piston unit 45 is pivotally connected. The cylinder 49 of the thrust piston unit 45 is pivotally connected to a bracket 50, which is fixed to the chassis frame 11.

Springs 53 and 54, preferably rubber springs, are provided between the rear tipping member 9 and the brakets 51 and 52.

The mutual positions of the various parts of the lorry when on inclined ground 40 are shown in FIG. 4.

FIGS. 7 to 9 show a trailer which has three rear axles 60, 61 and 62. The wheels 63 on the axle 60 are visible in FIG. 8, while the wheels 64 on the axle 62 can be seen in FIG. 9.

The tipping device consists of a heavy tipper ram, fixed to the front end 65 of the tipping body 7, and having a cylinder 66.

The cylinder 66 is linked to the front end 65 of the tipping body 7 by brackets 67 and 68 and a transverse member 69. The cylinder 66 is attached at its lower end to a support member 70 which is connected to a crossbar 73 of the chassis 74 by a shaft 72. The shaft 72 is parallel with the central longitudinal axis of the chassis 74, and its coaxial with a further shaft 75, about which the rear tipping member 9 can be pivoted relative to a crossbar 76 of the chassis 74.

Thrust piston units 77 and 78 serve to pivot the support member 70 and correspond to the thrust piston units 20 and 21, which pivot the rear tipping member 9. The thrust piston units 77 and 78 are connected to the thrust piston units 20 and 21 by a synchronizing control so that they pivot the frame bearing 70 in synchronism with the rear tipping member 9.

I claim:

1. A tipping vehicle comprising a chassis and a tipping body which initially rests on a front frame member and can be inclined backwards by pivoting about a rear axis contained in a rear tipping member by means of an elevating mechanism mounted on the chassis, the rear tipping member being mounted on the chassis for pivotal movement about an axis extending in the longitudinal direction of the vehicle and drive means for pivoting the rear tipping member being coupled between the rear tipping member and the frame, whereby after the tipping body has been lifted from the front frame member, the rear tipping member and the elevating mechanism pivot until the transverse direction of the tipping body is horizontal, said drive means comprises at least one thrust piston unit pivotally connected both to the rear tipping member and to the chassis.

2. A vehicle according to claim 1, wherein a lever is secured to the rear tipping member and the thrust piston unit is pivotally connected between the lever and the chassis.

3. A vehicle according to claim 1, wherein thrust piston units forming the drive means are positioned on both sides of the axis extending in the longitudinal direction of the vehicle.

4. A vehicle according to claim 1, wherein the elevating mechanism includes a support member coupled to the chassis by pivotal drive means which is arranged to operate in synchronism with the drive means for pivoting the rear tipping member.

5. A vehicle according to claim 1, including control means for said drive means having a regulator, of which the rest condition is the horizontal.

6. A vehicle according to claim 1, wherein springs are provided between the rear tipping member and the chassis.

7. A truck comprising
- a. a chassis frame having a rear wheel carrying axle,
- b. a subframe on said chassis frame having a front frame member,
- c. a tipping body on said subframe and resting on said front frame member when in horizontal position,
- d. a rear tipping member on said subframe about which said tipping body is rockable about a generally transverse axis,
- e. elevating mechanism for said tipping body,
- f. an operative connection between said rear tipping member and said chassis frame for enabling pivotal movement of such tipping member about an axis extending longitudinally of said chassis frame, and
- g. drive means interposed between said chassis frame and said tipping member remote from said wheel carrying axle and including operative thrust means for effecting such pivotal movement about a longitudinal axis.

* * * * *